(12) United States Patent
Ito

(10) Patent No.: US 9,417,108 B2
(45) Date of Patent: Aug. 16, 2016

(54) MASS FLOW METER WITH SELF-DIAGNOSTIC FUNCTION AND MASS FLOW CONTROLLER USING THE SAME

(71) Applicant: Hitachi Metals, Ltd., Tokyo (JP)

(72) Inventor: Hiroyuki Ito, Numazu (JP)

(73) Assignee: Hitachi Metals, Ltd., Tokyo (JP)

( * ) Notice: Subject to any disclaimer, the term of this patent is extended or adjusted under 35 U.S.C. 154(b) by 10 days.

(21) Appl. No.: 14/671,746

(22) Filed: Mar. 27, 2015

(65) Prior Publication Data

US 2015/0276449 A1 Oct. 1, 2015

(30) Foreign Application Priority Data

Mar. 31, 2014 (JP) ................................. 2014-072836

(51) Int. Cl.
*G01F 1/68* (2006.01)
*G01F 7/00* (2006.01)
*G01F 5/00* (2006.01)
*G01F 1/78* (2006.01)

(52) U.S. Cl.
CPC ........................................ *G01F 1/78* (2013.01)

(58) Field of Classification Search
None
See application file for complete search history.

(56) References Cited

U.S. PATENT DOCUMENTS

| 4,341,107 | A | * | 7/1982 | Blair | ........................ | C23C 16/52 |
| | | | | | | 137/101.19 |
| 4,672,997 | A | * | 6/1987 | Landis | .................. | G01F 1/6847 |
| | | | | | | 137/554 |
| 2009/0187356 | A1 | * | 7/2009 | Artiuch | ............... | G01F 25/0007 |
| | | | | | | 702/45 |
| 2009/0199633 | A1 | | 8/2009 | Sugimoto et al. | | |
| 2010/0017150 | A1 | * | 1/2010 | Itou | ......................... | G01F 1/667 |
| | | | | | | 702/45 |
| 2010/0080262 | A1 | * | 4/2010 | McDonald | .............. | G01F 1/684 |
| | | | | | | 374/166 |
| 2013/0092258 | A1 | * | 4/2013 | Yasuda | ................. | G01F 1/6842 |
| | | | | | | 137/487 |
| 2014/0190579 | A1 | * | 7/2014 | Ding | ..................... | G01F 25/003 |
| | | | | | | 137/487 |
| 2014/0230911 | A1 | * | 8/2014 | Hirata | ................. | G01F 25/0007 |
| | | | | | | 137/10 |

FOREIGN PATENT DOCUMENTS

| JP | 04313107 A | 11/1992 |
| JP | 2009192220 A | 8/2009 |
| JP | 2012226627 A | 11/2012 |

* cited by examiner

*Primary Examiner* — Harshad R Patel
(74) *Attorney, Agent, or Firm* — Neugeboren O'Dowd PC

(57) ABSTRACT

In a mass flow meter comprising two flow sensor units with identical specifications, flow rate deviations between these two flow sensor units are initially measured at various mass flow rates under a circumstance having the same fluctuating factors as those when a mass flow is actually measured. Subsequently, based on these flow rate deviations, a correction value for matching the values of the mass flow rates measured by these two flow sensor units is calculated and stored in a data storage device. Thereafter, when measuring a mass flow rate, a flow rate deviation, from which the influence by the individual difference in the response to a fluctuating factor between these two flow sensor units has been removed, is calculated by correcting a measured value based on the correction value. The existence or non-existence of an occurrence of a malfunction is judged based on whether the flow rate deviation exceeds a predetermined threshold value t or not.

11 Claims, 6 Drawing Sheets

MASS FLOW METER WITH SELF-DIAGNOSTIC FUNCTION AND MASS FLOW CONTROLLER USING THE SAME

CLAIM OF PRIORITY UNDER 35 U.S.C. §119

The present application for patent claims priority to Japanese Application No. 2014-072836 entitled "MASS FLOW METER AND MASS FLOW CONTROLLER USING THE SAME" filed Mar. 31, 2014, and assigned to the assignee hereof and hereby expressly incorporated by reference herein.

BACKGROUND

1. Field of the Invention

The present invention relates to a mass flow meter and a mass flow controller which uses the mass flow meter. More particularly, the present invention relates to a mass flow meter with a self-diagnostics function, and a mass flow controller which uses the mass flow meter.

2. Background

A mass flow meter (mass-flow meter) is widely used, for example, for the purpose of measuring mass flow rate of a process gas supplied into a chamber in a manufacturing process of a semi-conductor. In addition, a mass flow meter is not only used independently as mentioned above, but also used as a part which constitutes a mass flow controller (mass-flow controller) together with other members, such as a flow control valve and a control circuit. In the art, there are various types of mass flow meters, such as a thermal type mass flow meter, a differential pressure type mass flow meter, a hot-wire mass flow meter and a Coriolis mass flow meter, for example. Especially, a thermal type mass flow meter is widely used, since it can precisely measure a mass flow rate of a fluid (for instance, a gas or a liquid) with a comparatively simple configuration.

Generally, a thermal type mass flow meter is constituted by a flow passage through which a fluid flows, a bypass disposed in the middle of the flow passage, a sensor tube which branches from the flow passage at the upstream side of the bypass and joins the flow passage at the downstream side of the bypass, a pair of sensor wires wound around the sensor tube and a sensor circuit which comprises a bridge circuit containing the sensor wires and other resistive elements (as shown, for example, in Japanese Patent Application Laid-Open (kokai) No. 2009-192220). The bypass has a flow resistance to a fluid, and is configured so that a fixed proportion of the fluid which flows through the flow passage branches into the sensor tube.

In the above-mentioned configuration, when the pair of sensor wires generates heat by being impressed a predetermined voltage (or flowed a predetermined current), heat generated from the sensor wires is taken by the fluid which flows through the sensor tube. As a result, the fluid which flows through the sensor tube is heated. At this time, as for the sensor wire on the upstream side, heat is taken by the fluid which has not yet been heated. On the other hand, as for the sensor wire on the downstream side, heat is taken by the fluid which has been already heated by the sensor wire on the upstream side. For this reason, the amount of heat taken from the sensor wire on the upstream side is larger than the amount of heat taken from the sensor wire on the downstream side. As a result, temperature of the sensor wire on the upstream side becomes lower than that of the sensor wire on the downstream side. For this reason, an electrical resistance value of the sensor wire on the upstream side becomes lower than an electrical resistance value of the sensor wire on the downstream side. The larger the mass flow rate of the fluid which flows through the sensor tube becomes, the larger the difference between the electrical resistance values, which results from the temperature difference between the sensor wire on the upstream side and the sensor wire on the downstream side thus generated, becomes.

Changes of the difference of the electrical resistance values between the sensor wire on the upstream side and the sensor wire on the downstream side due to a mass flow rate of the fluid can be detected using a bridge circuit etc., for example. Furthermore, a mass flow rate of the fluid which flows through the sensor tube can be calculated based on the change of the difference of the electrical resistance values between the sensor wires thus detected, and the mass flow rate of the fluid which flows through the flow passage can be calculated based on the mass flow rate of the fluid which flows through the sensor tube (as discussed further herein in detail).

In addition, in this specification, a portion which has a function for measuring a mass flow rate of a fluid flowing through a flow passage is referred to as a "flow sensor unit." For example, a "flow sensor unit" in a thermal type mass flow meter corresponds to a portion which includes a sensor tube, sensor wires and a power supply for supplying an input signal for making the sensor wires generate heat.

Generally, a mass flow meter including a thermal type mass flow meter as mentioned above is calibrated by measuring a flow rate of a reference fluid (e.g., a reference gas, such as nitrogen gas ($N_2$), for instance) on the basis of another calibrated mass flow meter, immediately after the manufacture thereof, for example. However, while using a mass flow meter, it may become difficult to precisely measure a mass flow rate. For example, a measured value of a mass flow rate may show an abnormal value due to an occurrence of an unexpected abnormal situation, such as a situation where a foreign matter adheres to an inner wall of a sensor tube. However, while using a mass flow meter, it is difficult to detect that such an abnormal situation has occurred.

Then, in the art, a mass flow meter, in which two flow sensor units having completely identical specifications are disposed in series, is known, for example. In such a mass flow meter, each of the flow sensor units has been calibrated by measuring a flow rate of a reference fluid on the basis of another calibrated mass flow meter. Thereafter, when the absolute value of a difference between the intensities of the signals corresponding to a mass flow rate of a fluid outputted from these two flow sensor units (hereafter, may be referred to as a "flow rate deviation") exceeds a predetermined threshold value t while using the mass flow meter, it is judged that an abnormal situation has occurred in any one of these two flow sensor units.

For example, when a measurement error on measuring a mass flow rate of the same sort of fluid at the same temperature and pressure as those of the fluid used for the calibration is 1.0% or less, the above-mentioned predetermined threshold value t is set as a slightly larger value than 1.0%. Thereby, the existence or non-existence of an occurrence of an abnormal situation can be detected with a high sensitivity. Therefore, when the intensity of a signal corresponding to the mass flow rate of the fluid outputted from either of the abovementioned two flow sensor units shows an abnormal value, this malfunction can be detected immediately. But these prior mass flow meters have proven to be unsatisfactory in use when the fluid type in operation is different from the calibration fluid and/or when operating conditions are different than those that existed during calibration.

SUMMARY OF THE INVENTION

An aspect includes a mass flow meter comprising a flow passage through which a fluid flows; a first flow sensor unit which outputs a first signal that is an output signal corresponding to a mass flow rate of the fluid; a second flow sensor unit, which outputs a second signal that is an output signal corresponding to a mass flow rate of the fluid; and a first control unit, which determines whether there is a malfunction in the first flow sensor unit or the second flow sensor unit based on the extent of a deviation between the intensity of the first signal and the intensity of the second signal. The first flow sensor unit and the second flow sensor unit may have identical specifications.

The first control unit is configured to: flow the fluid through the flow passage at a plurality of different mass flow rates in a predetermined range and at a predetermined temperature and pressure and execute a learning function for each of the plurality of different mass flow rates. The learning function may include measuring an the intensity of the first signal and the intensity of the second signal, calculating a flow rate deviation between the intensity of the first signal and the intensity of the second signal, and calculating a correction value for correcting the intensity of a signal S, which is one of the first signal and the second signal, to make the absolute value of the flow rate deviation less than a predetermined threshold value d. In addition, the first control unit stores the flow rate deviation and the correction value in a data storage device in relation to a mass flow rate at the time of measuring the intensity of the first signal and the intensity of the second signal. The first control unit is also configured to execute a self-diagnostics function when measuring a mass flow rate of the fluid in the predetermined temperature and pressure after the execution of the learning function.

The self-diagnostics function carried out by the first control unit includes measuring the intensity of the first signal and the intensity of the second signal, correcting the intensity of the signal S based on the correction value stored in the data storage device, calculating a corrected flow rate deviation which is a deviation between the intensity of the corrected signal S and the intensity of a signal M which is one of the first signal and the second signal and a signal other than the signal S, determining that there is a malfunction in either one of the first flow sensor unit and the second flow sensor unit when the corrected flow rate deviation is larger than a predetermined threshold value t.

DETAILED DESCRIPTION

Figure 1:
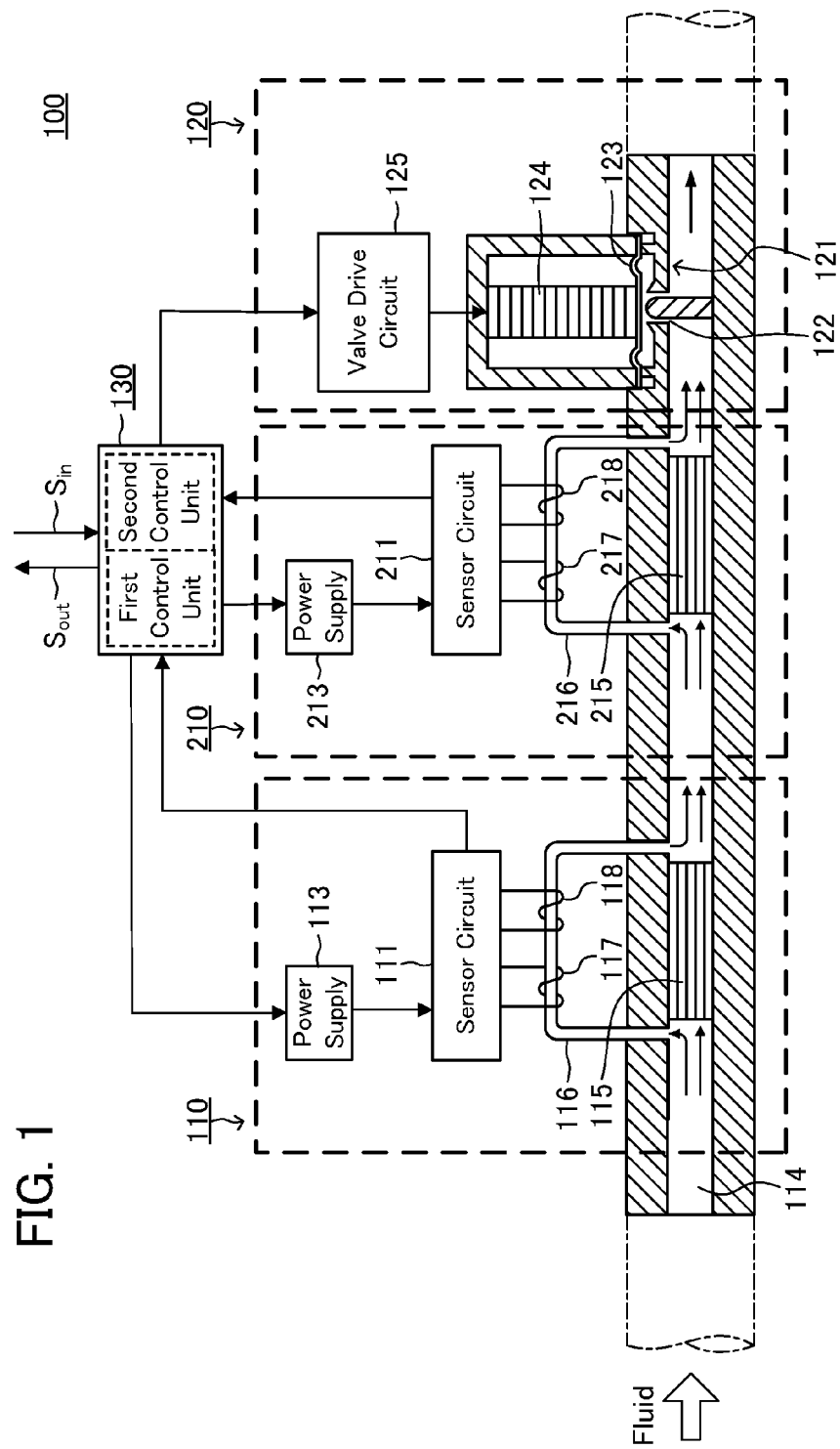
FIG. 1 is a schematic view showing an example of a configuration of a mass flow controller comprising a mass flow meter according to one embodiment of the present invention.

As mentioned above, a mass flow meter, which has two flow sensor units with completely identical specifications disposed in series and immediately detects an occurrence of an abnormal situation based on the absolute value of a flow rate deviation between these two flow sensor units, is known in the art. The abovementioned two flow sensor units are calibrated by measuring the flow rate of a reference fluid (for instance, a reference gas, such as nitrogen gas (N2)) on the basis of another calibrated mass flow meter, as mentioned above.

However, actually, a mass flow meter is used for measuring a mass flow rate of various sorts of fluids at various temperatures and pressures. When the sort of fluid whose mass flow rate is to be measured, and a temperature and pressure change, the intensity (e.g., a value) of a signal corresponding to a mass flow rate of the fluid outputted from a flow sensor unit changes even if the mass flow rate is constant. In this specification, a factor which thus changes the intensity of a signal corresponding to a mass flow rate of a fluid outputted from a flow rate sensor unit (for instance, sort of fluid, a temperature and pressure, etc.) is referred to as a "fluctuating factor." Furthermore, the fashion of a fluctuation of the intensity of a signal corresponding to a mass flow rate of a fluid outputted from a flow sensor unit resulting from a change of such a fluctuating factor is referred to as a "response to a fluctuating factor."

If the above-mentioned "responses to a fluctuating factor" of two flow sensor units are completely identical, unless an abnormal situation as mentioned above has occurred, no flow rate deviation exceeding a usual measurement error should rise between these two flow sensor units.

However, actually, there is certainly an individual difference between the flow characteristics of flow sensor units, and the fashions of a fluctuation of a measured value of a mass flow rate resulting from a change of a fluctuating factor, such as a sort of a fluid, a temperature and pressure, are not necessarily the same even if these flow sensor units have completely identical specifications. Namely, an individual difference does exist in the "response to a fluctuating factor" even between flow sensor units with completely identical specifications.

Furthermore, these fluctuating factors act independently on a flow rate deviation, respectively. If the extent of an influence on a flow rate deviation by each fluctuating factor is 1.0%, there is a possibility that the influences on a flow rate deviation by a plurality of fluctuating factors may be overlapped to increase the flow rate deviation by several percent (for instance, about 2 to 3%) at the maximum. Therefore, in a case where a (usual) measurement error on measuring a mass flow rate of the same sort of fluid at the same temperature and pressure as those of the fluid used for the calibration is 1.0% or less as mentioned above, there is a possibility that a flow rate deviation may increase up to about 4% when the influences on a flow rate deviation by a plurality of fluctuating factors are superimposed. For this reason, when the above-mentioned threshold value t is set at 4% or less, even if no unexpected abnormal situation (such as adhesion of a foreign matter to an inner wall of a sensor tube, etc.) has occurred actually, an incorrect judgment that an abnormal situation has occurred in any of these two flow sensor units may be made.

On the other hand, an incorrect judgment as mentioned above can be avoided, when the threshold value t is set at a value more than 4% (for instance, 5%). However, when the threshold value t is set at such a large value, an opportunity to detect an abnormal situation as mentioned above will decrease and a reliability of a self-diagnostics function will fall. As a result, there is a possibility that it becomes difficult to precisely measure a mass flow rate to cause problems, such as an increased frequency of occurrence of poor quality, etc. in an application in which the mass flow meter is used (for instance, a semi-conductor manufacturing processes, etc.) due to reduction of measurement accuracy of a mass flow rate.

Then, it is possible to reduce the measurement error resulting from fluctuating factors by previously measuring responses to all the fluctuating factors and referring to thus previously measured responses at the time of a measurement of a mass flow rate, as for both of the above-mentioned two flow sensor units. However, a huge operation is required for thus previously measuring the response to all the fluctuating factors and it leads to a large increase of a manufacturing cost of each mass flow controller.

In addition, even if the responses to all the fluctuating factors have been previously measured as mentioned above, it is expected that a response to a fluctuating factor is different between the above-mentioned two flow sensor units, for example, in a case where temporal change accompanying use is different between the above-mentioned two flow sensor units, etc. In such a case, even if the responses to all the fluctuating factors have been previously measured as mentioned above, they are not be helpful to an actual measurement of a mass flow rate.

As a result of a wholehearted investigation, the present inventor has found out that an influence by an individual difference in the response to a fluctuating factor can be eliminated and a reliable self-diagnostics can be performed, by previously measuring a flow rate deviation between two flow sensor units which have completely identical specifications, under a circumstance having the same fluctuating factors as those in a situation where a mass flow rate is actually measured, in a mass flow meter which comprises these two flow sensor units (will be explained later in detail). The effect of several embodiments disclosed herein is a mass flow meter which has a reliable self-diagnostics function. In this specification, a function for thus detecting the existence or non-existence of an occurrence of an abnormal situation in a mass flow meter is referred to as a "self-diagnostics function."

As mentioned above, in the art, there has been a continuous demand to a mass flow meter which has a reliable self-diagnostics function. Therefore, as mentioned above, as a result of a wholehearted investigation, the present inventor has found out that an influence by an individual difference in the response to a fluctuating factor can be eliminated and a reliable self-diagnostics can be performed, by previously measuring a flow rate deviation between two flow sensor units which have completely identical specifications, under a circumstance having the same fluctuating factors as those in a situation where a mass flow rate is actually measured, in a mass flow meter which comprises these two flow sensor units, and has conceived the present invention.

Specifically, in a mass flow meter comprising two flow sensor units which have completely identical specifications, flow rate deviations between these two flow sensor units at various mass flow rates are previously measured under a circumstance having the same fluctuating factors as those in a situation where a mass flow rate is actually measured. Subsequently, a correction value for matching the measurement results of the mass flow rates measured by these two flow sensor units is calculated based on these flow rate deviations and stored in a data storage device. Such a function to previously measure flow rate deviations between two flow sensor units at various mass flow rates and calculate a correction value for matching the measurement result of the mass flow rates measured by these two flow sensor units based on these flow rate deviations is referred to as a "learning function" in this specification. Thereafter, when measuring a mass flow rate, a flow rate deviation from which an influence by an individual difference in the response to a fluctuating factor between these two flow sensor units has been eliminated is calculated by correcting a measurement result based on the correction value.

A flow rate deviation obtained as mentioned above has not been affected by an influence of an individual difference in the response to a fluctuating factor. Namely, unless an abnormal situation as mentioned above has occurred, the flow rate deviation should not exceed a usual measurement error. Therefore, the existence or non-existence of an occurrence of an abnormal situation can be detected with a high sensitivity and a reliable self-diagnostics function can be achieved, by setting the above-mentioned predetermined threshold value t at a slightly larger value than a usual measurement error (for instance, 1.0%) and judging whether a flow rate deviation obtained as mentioned above exceeds the threshold value t or not.

Namely, a first embodiment of the present invention is, a mass flow meter comprising a flow passage through which a fluid flows; a first flow sensor unit which outputs a first signal that is an output signal corresponding to a mass flow rate of the fluid; a second flow sensor unit, which outputs a second signal that is an output signal corresponding to a mass flow rate of the fluid; and a first control unit, which determines whether there is a malfunction in the first flow sensor unit or the second flow sensor unit based on the extent of a deviation between the intensity of the first signal and the intensity of the second signal. The first flow sensor unit and the second flow sensor unit may have identical specifications.

The first control unit is configured to: flow the fluid through the flow passage at a plurality of different mass flow rates in a predetermined range and at a predetermined temperature and pressure and execute a learning function for each of the plurality of different mass flow rates. The learning function may include measuring the intensity of the first signal and the intensity of the second signal, calculating a flow rate deviation between the intensity of the first signal and the intensity of the second signal, and calculating a correction value for correcting the intensity of a signal S, which is one of the first signal and the second signal, to make the absolute value of the flow rate deviation less than a predetermined threshold value d. In addition, the first control unit stores the flow rate deviation and the correction value in a data storage device in relation to a mass flow rate at the time of measuring the intensity of the first signal and the intensity of the second signal. The first control unit is also configured to execute a self-diagnostics function when measuring a mass flow rate of the fluid in the predetermined temperature and pressure after the execution of the learning function.

The self-diagnostics function carried out by the first control unit includes measuring the intensity of the first signal and the intensity of the second signal, correcting the intensity of the signal S based on the correction value stored in the data storage device, calculating a corrected flow rate deviation which is a deviation between the intensity of the corrected signal S and the intensity of a signal M which is one of the first signal and the second signal and a signal other than the signal S, determining that there is a malfunction in either one of the first flow sensor unit and the second flow sensor unit when the corrected flow rate deviation is larger than a predetermined threshold value t.

As mentioned above, a mass flow meter according to the present embodiment comprises: a flow passage through which a fluid flows, a first flow sensor unit which outputs a first signal that is an output signal corresponding to a mass flow rate of the fluid which flows through the flow passage, and a second flow sensor unit which outputs a second signal that is an output signal corresponding to a mass flow rate of the fluid which flows through the flow passage.

Furthermore, in the mass flow meter according to the present embodiment, the first flow sensor unit and the second flow sensor unit have identical specifications. Specifically, in the first flow sensor unit and the second flow sensor unit, mechanisms which measure a mass flow rate of a fluid, the design specifications of the mechanisms, the dimension and the material of members which constitute the mechanisms, etc. are substantially identical. Namely, when an "individual difference in the response to a fluctuating factor" as mentioned above does not exist between the first flow sensor unit and the second flow sensor unit, no flow rate deviation exceeding a usual measurement error should rise between these two flow sensor units, unless an abnormal situation as mentioned above have occurred.

Furthermore, the mass flow meter according to the present embodiment comprises a first control unit which judges the existence or non-existence of a malfunction in the first flow sensor unit or the second flow sensor unit based on the extent of a deviation between the intensity (e.g., magnitude) of the first signal and the intensity (e.g., magnitude) of the second signal. This first control unit performs various processing, such as a detection of output signals from a first flow sensor unit and a second flow sensor unit as mentioned above (i.e., a first signal and a second signal), a calculation of a deviation between the intensities of these signals, and a judgment (e.g., determination) of the existence or non-existence of a malfunction. A first control unit which has such a function can be implemented as an electrical control unit, such as a microcomputer, built in a mass flow meter, for example. In addition, in FIG. 1, a first control unit is implemented as a control means 130.

As mentioned above, the mass flow meter according to the present embodiment is a mass flow meter which has a "self-diagnostics function" as mentioned at the beginning of this specification. Therefore, also in the mass flow meter according to the present embodiment, as mentioned above, should have been calibrated each of the first flow sensor unit and the second flow sensor unit by measuring a flow rate of a reference fluid (for instance, nitrogen gas ($N_2$), etc.) on the basis of another calibrated mass flow meter, it is possible to judge whether a malfunction occurred or not in any of these two flow sensor units, based on whether the absolute value of a difference (flow rate deviation) between the intensities of signals corresponding to mass flow rates of a fluid outputted from these two flow sensor units while a subsequent use of the mass flow meter exceeds a predetermined threshold value t or not.

However, also in two flow sensor units which have completely identical specifications like the first flow sensor unit and the second flow sensor unit, there is an individual difference in the response to a fluctuating factor, such as a sort of fluid, a temperature, and a pressure, as mentioned above. As a result, even when an unexpected abnormal situation, such as a situation where a foreign matter adheres to an inner wall of a sensor tube, for example, has not occurred, there is a possibility that a flow rate deviation increases due to the individual difference in the response to a fluctuating factor between the first flow sensor unit and the second flow sensor unit and an incorrect judgment that a malfunction has occurred in any of these two flow sensor units may be made.

Then, in the mass flow meter according to the present embodiment, as mentioned above, in this mass flow meter comprising two flow sensor units which have completely identical specifications, flow rate deviations between these two flow sensor units are previously measured at various mass flow rates under a circumstance having the same fluctuating factors as those in a situation where a mass flow is actually measured. Subsequently, based on these flow rate deviations, a correction value for matching the measurement results of mass flow rates measured by these two flow sensor units is calculated and stored in a data storage device. Namely, the above-mentioned "learning function" is executed.

Thereafter, when measuring a mass flow rate, a flow rate deviation from which an influence by an individual difference in the response to a fluctuating factor between these two flow sensor units has been eliminated, is calculated by correcting a measurement result based on the correction value. A flow rate deviation thus obtained has not been affected by an influence of an individual difference in the response to a fluctuating factor. Namely, unless an abnormal situation as mentioned above have occurred in any of the two flow sensor units, the flow rate deviation should not exceed a usual measurement error. Therefore, the existence or non-existence of an occurrence of an abnormal situation is judged with a high sensitivity by setting the above-mentioned predetermined threshold value t as a slightly larger value than the usual measurement error (for instance, 1.0%). Namely, the above-mentioned "self-diagnostics function" is executed.

Specifically, in the mass flow meter according to the present embodiment, the first control unit flows the fluid through the flow passage at a plurality of different mass flow rates in a predetermined range and at a predetermined temperature and pressure, and the first control unit executes a learning function for each of the plurality of different mass flow rates, in which: the first control unit measures the intensity of the first signal and the intensity of the second signal, the first control unit calculates a flow rate deviation, which is a deviation between the intensity of the first signal and the intensity of the second signal, and a correction value for correcting the intensity of a signal S, which is one of the first signal and the second signal, to make the absolute value of the flow rate deviation less than a predetermined threshold value d, and the first control unit stores the flow rate deviation and the correction value in a data storage device in relation to a mass flow rate at the time of measuring the intensity of the first signal and the intensity of the second signal.

In the above, the predetermined range of mass flow rates can be a range of mass flow rates assumed for a fluid used in an application to which the mass flow meter according to the present embodiment is applied. Typically, the predetermined range of mass flow rates can be a predetermined range of mass flow rates in 0% to 100% of a full scale (measurable maximal flow rate) of the mass flow meter according to the present embodiment. The plurality of different mass flow rates included in the predetermined range thus set can be also properly set within the predetermined range. Typically, such plurality of different mass flow rates can be set at a certain interval within the predetermined range. For instance, the plurality of different mass flow rates can be set at 0%, 10%, 20% . . . 90% and 100% of the full scale of the mass flow meter according to the present embodiment. Furthermore, the predetermined temperature and pressure are set at a temperature and pressure which are assumed for the fluid used in an application to which the mass flow meter according to the present embodiment is applied.

In each of the plurality of different mass flow rates determined as mentioned above, the first control unit measures the intensity of the first signal, which is an output signal corresponding to the mass flow rate of the fluid outputted from the first flow sensor unit, and the intensity of the second signal, which is an output signal corresponding to the mass flow rate of the fluid outputted from the second flow sensor unit.

Next, the first control unit calculates the flow rate deviation which is a deviation between the intensity of the first signal and the intensity of the second signal as obtained above. Furthermore, the first control unit calculates a correction value required to correct the intensity of a signal S which is one of the first signal and the second signal and to approximately match the intensity of the signal S with the intensity of a signal M which is one of the first signal and the second signal and a signal other than the signal S. Specifically, the first control unit calculates a correction value for correcting the intensity of the signal S to make the absolute value of the flow rate deviation less than a predetermined threshold value d. For example, this threshold value d can be set in consideration of a measurement error, a noise and a detection accuracy of the first flow sensor unit and the second flow sensor unit, etc., in a normal situation where there is no influence by an individual difference in the response to a fluctuating factor and an occurrence of an unexpected abnormal situation such as a situation where a foreign matter adheres to an inner wall of a sensor tube in the mass flow meter. Thus, the threshold value d is a threshold value used only in the execution of a learning function, and the smaller the value of the threshold value d is, the more the absolute value of the deviation (flow rate deviation) between the corrected intensity of the signal S and the intensity of the signal M approaches 0 (zero).

Moreover, the above-mentioned correction value may be a value obtained by subtracting the intensity of the signal S from the intensity of the signal M, for example. In this case, a flow rate deviation can be brought close to 0 (zero) by adding the correction value to the intensity of the signal S. Alternatively, this correction value may be a value obtained by dividing the intensity of the signal M by the intensity of the signal S, for example. In this case, a flow rate deviation can be brought close to 0 (zero) by multiplying the intensity of the signal S by the correction value.

Next, the first control unit stores the flow rate deviation and the correction value obtained as mentioned above in a data storage device in relation to a mass flow rate at the time of measuring the intensity of the first signal and the intensity of the second signal. As this data storage device, for example, a data storage device, such as ROM (for instance, EEPROM) and RAM, which an electrical control unit constituting the first control unit (such as a microcomputer) comprises, can be used. When the flow rate deviation and correction value in relation to the mass flow rate are thus stored in a data storage device for all the plurality of different mass flow rates, the first control unit will complete the execution of the learning function.

In addition, the above-mentioned learning function may be implemented as a program (e.g., a collection of non-transitory processor-executable instructions) stored in a data storage device, such as ROM (for instance, EEPROM), non-volatile memory (e.g., NAND flash memory), and RAM, etc., which an electrical control unit constituting the first control unit (such as a microcomputer including a processor) comprises, or as application software installed in a computer as non-transitory processor-executable instructions and used in cooperation with the mass flow meter according to the present embodiment, so as to be automatically executed when the mass flow meter is used for the first time after manufacturing, for example. Alternatively, the abovementioned learning function may be configured so as to be started by an operation by a user to an operating part, such as a button, which the mass flow meter according to the present embodiment comprises, or to a user interface provided by an application software installed in a computer used in cooperation with the mass flow meter, for example.

The first control unit executes a self-diagnostics function when measuring a mass flow rate of the fluid in the predetermined temperature and pressure after the execution of the learning function, in which: the first control unit measures the intensity of the first signal and the intensity of the second signal, the first control unit corrects the intensity of the signal S based on the correction value stored in the data storage device, the first control unit calculates a corrected flow rate deviation which is a deviation between the intensity of the corrected signal S and the intensity of a signal M which is one of the first signal and the second signal and a signal other than the signal S, and the first control unit judges that there is a malfunction in either one of the first flow sensor unit and the second flow sensor unit when the corrected flow rate deviation is larger than a predetermined threshold value t. The self-diagnostics function may also be implemented as a program (e.g., a collection of non-transitory processor-executable instructions) stored in a data storage device, such as ROM (for instance, EEPROM), non-volatile memory, and RAM, etc., which an electrical control unit constituting the first control unit (such as a microcomputer) comprises, or as application software installed in a computer as non-transitory processor-executable instructions and used in cooperation with the mass flow meter.

For example, "when measuring a mass flow rate of the fluid in the predetermined temperature and pressure after the execution of the learning function" refers to the time of measuring a mass flow rate of a fluid (for instance, a process gas used in a semi-conductor manufacturing process, etc.) used in an application in which the mass flow meter is used (for instance, a semi-conductor manufacturing process, etc.). Alternatively, for example, "when measuring a mass flow rate of the fluid in the predetermined temperature and pressure" may be a time when the above-mentioned learning function is executed by an operation by a user, as mentioned above.

As mentioned above, when measuring a mass flow rate of the fluid in the predetermined temperature and pressure after the execution of the learning function, the first control unit measures the intensity of the first signal which is an output signal corresponding to the mass flow rate of the fluid outputted from the first flow sensor unit and the intensity of the second signal which is an output signal corresponding to the mass flow rate of the fluid outputted from the second flow sensor unit, first.

Next, the first control unit corrects the intensity of the above-mentioned signal S based on the correction value stored in the data storage device by the execution of the learning function. At this time, the first control unit can determine the value of the correction value corresponding to the mass flow rate of a fluid obtained from the above-mentioned signal M based on the relation between the mass flow rates and the correction values stored in the data storage device by the execution of the above-mentioned learning function, and can correct the intensity of the above-mentioned signal S based on the value of the correction value thus determined. In this case, since the intensity of the signal S is corrected by the correction value in accordance with the mass flow rate of the fluid whose mass flow rate is to be measured, the influence of the individual difference in the response to a fluctuating factor can be more strictly eliminated. As a result, an occurrence of a malfunction in the first flow sensor unit or the second flow sensor unit can be detected with a high sensitivity.

Alternatively, in some cases, the first control unit may correct the intensity of the above-mentioned signal S, based on a representative value of all the correction values stored in the data storage device by the execution of the learning function. As examples of cases where such a technique is desired, for instance, a case where the fluctuation of the magnitudes of the correction values in the range of mass flow rates, at which the correction values have been learned, is small, a case where a high sensitivity is not required in a detection of an occurrence of a malfunction in the first flow sensor unit or the second flow sensor unit, and a case where processing load (of CPU) in the first control unit needs to be reduced, etc. can be exemplified.

Next, the first control unit calculates a corrected flow rate deviation which is a deviation between the intensity of the signal S corrected as mentioned above and the intensity of the above-mentioned signal M, and judges that there is a malfunction in either one of the first flow sensor unit and the second flow sensor unit when the corrected flow rate deviation calculated as mentioned above is larger than a predetermined threshold value t. At this time, the intensity of the signal S has been corrected by the correction value as mentioned above. Therefore, in the corrected flow rate deviation, the influence by the individual difference in the response to a fluctuating factor between the first flow sensor unit and the second flow sensor unit has been eliminated.

Namely, unless an abnormal situation as mentioned above have occurred in any of the first flow sensor unit and the second flow sensor unit, the corrected flow rate deviation should not exceed a usual measurement error. Therefore, in accordance with the mass flow meter according to the present embodiment, the existence or non-existence of an occurrence of an abnormal situation can be judged with a high sensitivity by setting the above-mentioned predetermined threshold value t as a slightly larger value than the usual measurement error (for instance, 1.0%). Thus, the threshold value t is a threshold value used only in the execution of a self-diagnostics function.

In addition, the above-mentioned self-diagnostics function may also be implemented as a program (e.g., a collection of non-transitory processor-executable instructions) stored in a data storage device, such as ROM (for instance, EEPROM), non-volatile (e.g., flash memory), and RAM, etc., which an electrical control unit constituting the first control unit (such as a microcomputer including a processor) comprises, or as an application software installed in a computer used in cooperation with the mass flow meter, so as to be automatically executed when a predetermined period has passed, or every predetermined number of times (may be every time) a measurement of a mass flow rate has been executed, after the execution of the above-mentioned learning function, for example. Alternatively, the above-mentioned self-diagnostics function may be configured so as to be started by an operation by a user to an operating part, such as a button, which the mass flow meter according to the present embodiment comprises, or to a user interface provided by an application software installed in a computer used in cooperation with the mass flow meter, for example.

By the way, as mentioned above, when the first control unit corrects the intensity of the above-mentioned signal S based on the correction value stored in the data storage device by the execution of the learning function, the first control unit can determine the value of the correction value corresponding to the mass flow rate of a fluid obtained from the above-mentioned signal M based on the relation between the mass flow rates and the correction values stored in the data storage device by the execution of the above-mentioned learning function, and can correct the intensity of the above-mentioned signal S based on the value of the correction value thus determined.

Therefore, a second embodiment of the present invention is, a mass flow meter according to the first embodiment of the present invention, wherein in the execution of the self-diagnostics function, the first control unit determines a value of a correction value corresponding to a mass flow rate of the fluid obtained from the signal M, based on a relation between the mass flow rates and the correction values stored in the data storage device, and the first control unit corrects the intensity of the signal S, based on the value of the determined correction value.

In the above, the relation between the above-mentioned mass flow rates and the above-mentioned correction values may be stored in the above-mentioned data storage device as a data table which contains the plurality of different mass flow rates, at which the above-mentioned learning function was executed, and the above-mentioned correction values corresponding to the respective ones of the plurality of different mass flow rates, for example. In this case, the correction value corresponding to the mass flow rate itself of the fluid obtained from the signal M does not necessarily exist in the data table. However, when such a correction value does not exist, an intended correction value can be determined from by extrapolation or interpolations (for instance, linear interpolation, etc.) from the correction value corresponding to the mass flow rate near the mass flow rate of the fluid obtained from the signal M, for example.

Alternatively, the relation between the above-mentioned mass flow rates and the above-mentioned correction values may be stored in the above-mentioned data storage device as an approximation derived from the plurality of different mass flow rates, at which the above-mentioned learning function was executed, and the above-mentioned correction values corresponding to the respective ones of the plurality of different mass flow rates, for example. In this case, the approximation can be defined as a function which has a mass flow rate as an argument and a correction value as a return value. Therefore, in this case, the value of a corresponding correction value can be determined by passing the mass flow rate of the fluid obtained from the signal M to the function.

Since the correction value according to the mass flow rate of the fluid whose mass flow rate is to be measured is determined, for example, as mentioned above and the intensity of the signal S is corrected by the determined correction value in accordance with the mass flow meter according to the present embodiment as mentioned above, the influence of the individual difference in the response to a fluctuating factor can be more strictly eliminated. As a result, an occurrence of a malfunction in the first flow sensor unit or the second flow sensor unit can be detected with a high sensitivity.

Alternatively, as mentioned above, the first control unit can also correct the intensity of the above-mentioned signal S based on a representative value of all the correction values stored in the data storage device by the execution of the above-mentioned learning function.

Therefore, a third embodiment includes a mass flow meter according to the first embodiment of the present invention, wherein: in the execution of the self-diagnostics function, the first control unit corrects the intensity of the signal S, based on a representative value of all the correction values stored in the data storage device.

In the above, as a representative value of all the correction values stored in data storage device, for example, an average value of a plurality of the abovementioned correction values corresponding to the respective ones of the plurality of different mass flow rates at which the above-mentioned learning function was executed can be adopted. In the mass flow meter according to the present embodiment, the influence of the individual difference in the response to a fluctuating factor can be more easily eliminated by correcting the intensity of the above-mentioned signal S using the representative value thus determined.

As mentioned above, as examples of cases where such an embodiment is desired, for instance, a case where the fluctuation of the magnitudes of the correction values in the range of mass flow rates, at which the correction values have been learned, is small, and a case where a high sensitivity is not required in a detection of an occurrence of a malfunction in the first flow sensor unit or the second flow sensor unit, etc. can be exemplified. Moreover, since processing load (of CPU) in the first control unit can be reduced in accordance with the mass flow meter according to the present embodiment, such an embodiment is suitably adopted in a case where processing capacity (of CPU) in the first control unit is low, etc.

By the way, as mentioned above, the above-mentioned correction value may be a value obtained by subtracting the intensity of the signal S from the intensity of the signal M, for example. In this case, a flow rate deviation can be brought close to 0 (zero) by adding the correction value to the intensity of the signal S.

Therefore, a fourth embodiment includes a mass flow meter according to any one of the first to third embodiments of the present invention, wherein: the first control unit calculates as the correction value a value obtained by subtracting the intensity of the signal S from the intensity of the signal M, in the execution of the learning function, and the first control unit corrects the intensity of the signal S by adding the correction value to the intensity of the signal S, in the execution of the self-diagnostics function.

Alternatively, the above-mentioned correction value may be a value obtained by dividing the intensity of the signal M by the intensity of the signal S, for example. In this case, a flow rate deviation can be brought close to 0 (zero) by multiplying the intensity of the signal S by the correction value.

Therefore, a fifth embodiment of the present invention is, a mass flow meter according to any one of the first to third embodiments of the present invention, wherein: the first control unit calculates as the correction value a value obtained by dividing the intensity of the signal M by the intensity of the signal S, in the execution of the learning function, and the first control unit corrects the intensity of the signal S by multiplying the intensity of the signal S by the correction value, in the execution of the self-diagnostics function.

In addition, it can be properly chosen which to adopt as a correction value, a value obtained by subtracting the intensity of the signal S from the intensity of the signal M or a value obtained by dividing the intensity of the signal M by the intensity of the signal S, for example, depending on which one of respective flow rate deviations when respective ones of the values are adopted as correction values is smaller.

By the way, as mentioned at the beginning of this specification, in the art, various types of mass flow meters, such as a thermal type mass flow meter, a differential pressure type mass flow meter, a hot-wire mass flow meter and a Coriolis mass flow meter, etc. are known. Among these, a thermal type mass flow meter is widely used, since it can precisely measure a mass flow rate of a fluid (for instance, a gas or a liquid) with a comparatively simple configuration as mentioned above. As a matter of course, a mass flow meter according to the present invention may be any of these mass flow meters which adopt various modes. For example, a flow sensor unit which a mass flow meter according to the present invention comprises may be a flow sensor unit of the type included in a thermal type mass flow meter (thermal type flow sensor unit).

Therefore, a sixth embodiment of the present invention includes a mass flow meter according to any one of the first to fifth embodiments of the present invention, wherein: the first flow sensor unit and the second flow sensor unit are thermal type flow sensor units, comprising: a bypass disposed in the middle of the flow passage, a sensor tube which branches from the flow passage at the upstream side of the bypass and joins the flow passage at the downstream side of the bypass, a pair of sensor wires disposed so as to be able to conduct heat to a fluid flowing through the sensor tube, a power supply for supplying an input signal for making the sensor wires generate heat, and a sensor circuit which comprises a bridge circuit containing the sensor wires.

In the above-mentioned configuration, the bypass has a flow resistance to a fluid, and a fixed proportion of the fluid which flows through the flow passage branches into the sensor tube. When the pair of sensor wires generates heat by being supplied a predetermined input signal, heat generated from the sensor wires is taken by the fluid which flows through the sensor tube. At this time, the larger the flow rate of the fluid flowing through the sensor tube becomes, the more the temperature of the sensor wire on the upstream side becomes lower than that of the sensor wire on the downstream side. The sensor circuit can detect an output signal corresponding to the difference of an electrical resistance value between the sensor wire on the upstream side and the sensor wire on the downstream side resulting therefrom. The mass flow rate of the fluid which flows through the sensor tube can be obtained based on the output signal thus detected, and the mass flow rate of the fluid which flows through the flow passage can be obtained based on the mass flow rate of the fluid which flows through the sensor tube.

Also in the mass flow meter which has the above-mentioned configuration, when the first control unit executes the above-mentioned learning function and self-diagnostics function, unless an abnormal situation as mentioned above have occurred in any of the first flow sensor unit and the second flow sensor unit, the corrected flow rate deviation should not exceed a usual measurement error. Therefore, also in accordance with the mass flow meter according to the present embodiment, the existence or non-existence of an occurrence of an abnormal situation in a flow sensor unit can be judged with a high sensitivity by setting the predetermined threshold value t as a slightly larger value than the usual measurement error.

By the way, in the above-mentioned configuration, the first flow sensor unit and the second flow sensor unit may be arranged in series in the flow passage through which a fluid flows. In this case, the first flow sensor unit and the second flow sensor unit comprise an individual bypass, respectively. Furthermore, a sensor tube, a pair of sensor wires, a power supply, and a sensor circuit are disposed for each bypass.

Namely, a seventh embodiment includes a mass flow meter according to the sixth embodiment of the present invention, wherein: the first flow sensor unit and the second flow sensor unit comprise an individual bypass, respectively.

As mentioned above, in the mass flow meter according to the present embodiment, the first flow sensor unit and the second flow sensor unit are arranged in series in the flow passage through which a fluid flows, and respective sensor units comprise an individual bypass respectively. Furthermore, for each bypass, a sensor tube, a pair of sensor wires, a power supply, and a sensor circuit are disposed. Here, a case where the first flow sensor unit is disposed on an upstream side and the second flow sensor unit is disposed on the downstream side in the flow passage of a fluid will be explained below in detail. However, as a matter of course, the first flow sensor unit may be disposed on the downstream side and the second flow sensor unit may be disposed on the upstream side. Furthermore, in the following explanations, the bypass which constitutes the first flow sensor unit is referred to as a "first bypass" and the bypass which constitutes the second flow sensor unit is referred to as a "second bypass."

The first flow sensor unit comprises: a first bypass that is a bypass on the upstream side disposed in series in the middle of the flow passage, a first sensor tube which branches from the flow passage at the upstream side of the first bypass and joins the flow passage at the downstream side of the first bypass, a pair of first sensor wires disposed so as to be able to conduct heat to a fluid flowing through the first sensor tube, a first power supply for supplying an input signal for making the first sensor wires generate heat, and a first sensor circuit which comprises a bridge circuit containing the first sensor wires.

The second flow sensor unit comprises: a second bypass that is a bypass on the downstream side disposed in series in the middle of the flow passage, a second sensor tube which branches from the flow passage at the upstream side of the second bypass and joins the flow passage at the downstream side of the second bypass, a pair of second sensor wires disposed so as to be able to conduct heat to a fluid flowing through the second sensor tube, a second power supply for supplying an input signal for making the second sensor wires generate heat, and a second sensor circuit which comprises a bridge circuit containing the second sensor wires.

In addition, as mentioned above, the first flow sensor unit and the second flow sensor unit have identical specifications. Therefore, the first bypass and the second bypass, the first sensor tube and the second sensor tube, the first sensor wires and the second sensor wires, and the first sensor circuit and the second sensor circuit have identical specifications, respectively. Specifically, for example, the first bypass and the second bypass have an identical flow resistance to a fluid, the first sensor tube and the second sensor tube are formed of an identical material and have an identical inner radius and an identical route length. Furthermore, the first sensor wires and the second sensor wires are formed of an identical material and have an identical electrical resistance value and amount of heat generation, and the first sensor circuit and the second sensor circuit have an identical circuit configuration constituted with identical circuit elements.

Here, an example of the configuration of the mass flow meter according to the present embodiment will be explained in detail below, referring to accompanying drawings. As mentioned above, FIG. 1 is a schematic view showing an example of a configuration of a mass flow controller comprising a mass flow meter according to one embodiment of the present invention. Furthermore, as mentioned above, FIG. 2 is a schematic view showing an example of a configuration of a sensor circuit which a mass flow meter according to one embodiment of the present invention comprises. As shown in FIG. 1, the mass flow controller 100 comprises the first flow sensor unit 110, the second flow sensor unit 210, the flow regulation unit 120, and the control means 130 (corresponding to a "first control unit" and a "second control unit" which will be mentioned later).

Figure 2:
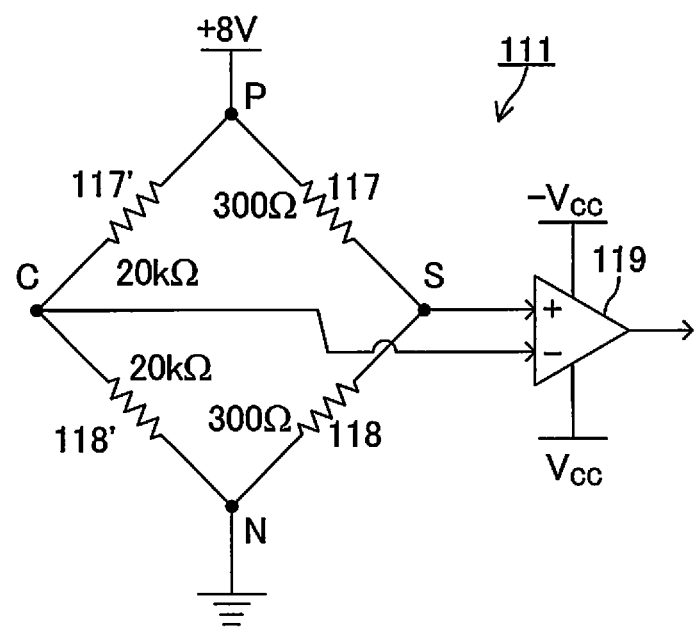
FIG. 2 is a schematic view showing an example of a configuration of a sensor circuit which a mass flow meter according to one embodiment of the present invention comprises.

The first flow sensor unit 110 is constituted by the flow passage 114 through which a fluid flows, the bypass 115 disposed in the middle of the flow passage 114, the sensor tube 116 which branches from the flow passage 114 at the upstream side of the bypass 115 and joins the flow passage 114 at the downstream side of the bypass 115, a pair of the sensor wires 117 and 118 wound around the sensor tube 116, the power supply 113 for supplying a predetermined input signal to the sensor wires 117 and 118 to generate heat, and the sensor circuit 111 comprising the bridge circuit which contains the sensor wires 117 and 118, other resistive elements 117', and 118' as shown in FIG. 2.

The bypass 115 has a flow resistance to a fluid, and it is configured so that a fixed proportion of the fluid which flows through the flow passage 114 branches into the sensor tube 116. In addition, in the configuration shown in FIG. 1, a pair of the sensor wires 117 and 118 is wound around the sensor tube 116. However, as long as the heat generated from the sensor wires can be conducted to the fluid which flows through the sensor tube, a concrete configuration of sensor wires is not limited particularly.

In the above-mentioned configuration, when a predetermined input signal (electrical signal) is supplied (input) to the sensor wires 117 and 118 from the power supply 113, a Joule's heat will be generated, and this heat is taken by the fluid which flows through the sensor tube 116. At this time, the sensor wire 117 on the upstream side has heat taken by the fluid which has not yet been heated, while the sensor wire 118 on the downstream side has heat taken by the fluid which has been already heated by the sensor wire 117 on the upstream side. For this reason, temperature of the sensor wire 118 on the downstream side becomes higher than that of the sensor wire 117 on the upstream side. As a result, an electrical resistance value of the sensor wire 118 on the downstream side becomes higher than that of the sensor wire 117 on the upstream side. In addition, the input signal (electrical signal) supplied (input) to the sensor wires for the purpose of heat generation may be controlled based on any of a voltage and current.

The difference (ratio) of the electrical resistance values, which results from the temperature difference between the sensor wire 117 on the upstream side and the sensor wire 118 on the downstream side thus generated, changes depending on the mass flow rate of the fluid which flows through the sensor tube 116. As a result, the potential difference between the point S and the point C of the sensor circuit 111 also changes depending on the mass flow rate of the fluid which flows through the sensor tube 116. The mass flow rate of the fluid which flows through the sensor tube 116 can be measured by detecting a change of such a potential difference, for example, through the operational amplifier 119. Furthermore, based on the mass flow rate of the fluid which flows through the sensor tube 116 thus measured, the mass flow rate of the fluid which flows through the flow passage 114 can be obtained.

In the sensor circuit shown in FIG. 2, the sensor wires 117 and 118 which respectively have a resistance value of 300Ω are connected in series at the point S, and other resistive elements 117' and 118' which respectively have a resistance value of 20 k Ω are connected in series at the point C. Furthermore, the both ends of the sensor wires 117 and 118 connected in series as mentioned above and the both ends of other resistive elements 117' and 118' connected in series as mentioned above are connected at the point P and the point N, respectively. Namely, the sensor wires 117 and 118 and the resistive elements 117' and 118' constitute what is called a "Wheatstone bridge."

At the time of a measurement of a mass flow rate, a predetermined input signal (electrical signal) is supplied (input) between the above-mentioned points P and N from the power supply 113, and a Joule's heat generates from the sensor wires 117 and 118. Furthermore, the points S and C are respectively connected to the non-inverting input (+) and inverting input (−) of the operational amplifier 119, and the signal according to the potential difference between the points S and C is obtained as an output power of the operational amplifier 119. Based on the output signal thus obtained from the operational amplifier 119, the mass flow rate of the fluid which flows through the sensor tube 116 can be measured. However, when the electrical resistance of other resistive elements 117' and 118' is affected by the influence of heat generation from the sensor wires 117 and 118, the mass flow rate of the fluid which flows through the sensor tube 116 cannot be precisely measured. Therefore, other resistive elements 117' and 118' are arranged at a location and/or in a status where they are not substantially affected by the influence of heat generation from the sensor wires 117 and 118.

The second flow sensor unit 210 is disposed on the downstream side of the first flow sensor unit 110 in the flow passage 114, and has a configuration completely identical to that of the first flow sensor unit 110. Specifically, as mentioned above, the first bypass 115 and the second bypass 215, the first sensor tube 116 and the second sensor tube 216, the first sensor wires 117 and 118 and the second sensor wires 217 and 218, and the first sensor circuit 111 and the second sensor circuit 211 have identical specifications, respectively.

As mentioned above, in FIG. 1, the reference signs indicating respective constituents of the second flow sensor unit 210 have the same last two digit as those indicating corresponding respective constituents of the first flow sensor unit 110. Therefore, the explanation about respective constituents of the second flow sensor unit 210 is the same as the explanation about respective constituents of the first flow sensor unit 110, and therefore omitted. Moreover, since the configuration of the sensor circuit 211 which constitutes the second flow sensor unit 210 is completely identical to the configuration of the sensor circuit 111 which has been already explained referring to FIG. 2, the explanation about the sensor circuit 211 is also omitted.

In addition, as mentioned above, FIG. 1 is a schematic view showing an example of a configuration of a mass flow controller comprising a mass flow meter according to one embodiment of the present invention. Therefore, although the flow regulation unit 120 and the control means 130, etc. are also drawn in FIG. 1, besides the first flow sensor unit 110 and the second flow sensor unit 210, as mentioned above, these are not explained here since these will be explained in detail in an explanation about an embodiment of the present invention as a mass flow controller.

In both of the first flow sensor unit 110 and the second flow sensor unit 210, material which has an outstanding corrosion resistance and mechanical strength is desirable as material for a sensor tube, and metals (namely, conductors), such as stainless steel (SUS), are generally used. On the other hand, as material for a sensor wire, a conductor is used, as a matter of course. Specifically, as material for a sensor tube, for example, material which has an outstanding corrosion resistance and mechanical strength, such as a stainless steel including SUS316, is used. On the other hand, as material a sensor wire, conductors (for instance, metals, such as copper) which have a desired electrical resistance value, such as an enameled wire, etc., are used. Namely, in general, both of material for a sensor tube and material for a sensor wire are conductors.

Therefore, in a flow sensor, it is common that a covering layer formed of insulation material, such as resin, etc., is disposed in the surroundings of the portion of the sensor tube with a sensor wire wound and the sensor wire, for the purpose of a prevention of the conduction between the sensor tube and the sensor wire and the conduction between sensor wires and a fixation of the sensor wire on the sensor tube, etc. In addition, for measurement of a mass flow rate by a flow sensor, as mentioned above, the heat which generates from a sensor wire by electricity needs to be taken by the sensor tube and the fluid which flows through the sensor tube. Therefore, it is desirable that at least the covering layer which intervenes between the sensor wire and the sensor tube has a good thermal conductivity.

Also in the mass flow meter which has the configuration shown in FIG. 1 and FIG. 2, when the first control unit executes the above-mentioned learning function and self-diagnostics function, unless an abnormal situation as mentioned above have occurred in any of the first flow sensor unit and the second flow sensor unit, the corrected flow rate deviation should not exceed a usual measurement error. Therefore, also in accordance with the mass flow meter according to the present embodiment, the existence or non-existence of an occurrence of an abnormal situation in a flow sensor unit can be judged with a high sensitivity by setting the predetermined threshold value t as a slightly larger value than the usual measurement error.

By the way, in the mass flow meter according to the sixth embodiment of the present invention, the first flow sensor unit and the second flow sensor unit may be arranged in parallel in the flow passage through which a fluid flows. In this case, the first flow sensor unit and the second flow sensor unit comprise a common bypass. In other words, the first flow sensor unit and the second flow sensor unit share one bypass. However, a sensor tube, a pair of sensor wires, a power supply, and a sensor circuit are individually disposed for every sensor unit.

Namely, an eighth embodiment includes a mass flow meter according to the sixth embodiment of the present invention, wherein: the first flow sensor unit and the second flow sensor unit comprise a common bypass.

Hereinafter, an example of the configuration of the mass flow meter according to the present embodiment will be explained below, referring to accompanying drawings. As mentioned above, FIG. 6 is a schematic view showing an example of a configuration of a mass flow controller comprising a mass flow meter according to another embodiment of the present invention. The mass flow controller according to the embodiment shown in FIG. 6 has the same configuration as the mass flow controller according to the embodiment shown in FIG. 1, except for two points that only one bypass 115 is disposed in the flow passage 114 and that the first flow sensor unit 110 and the second flow sensor unit 210 share this bypass 115. For example, the sensor circuits 111 and 211 with the configuration shown in FIG. 2 can be used.

Figure 6:
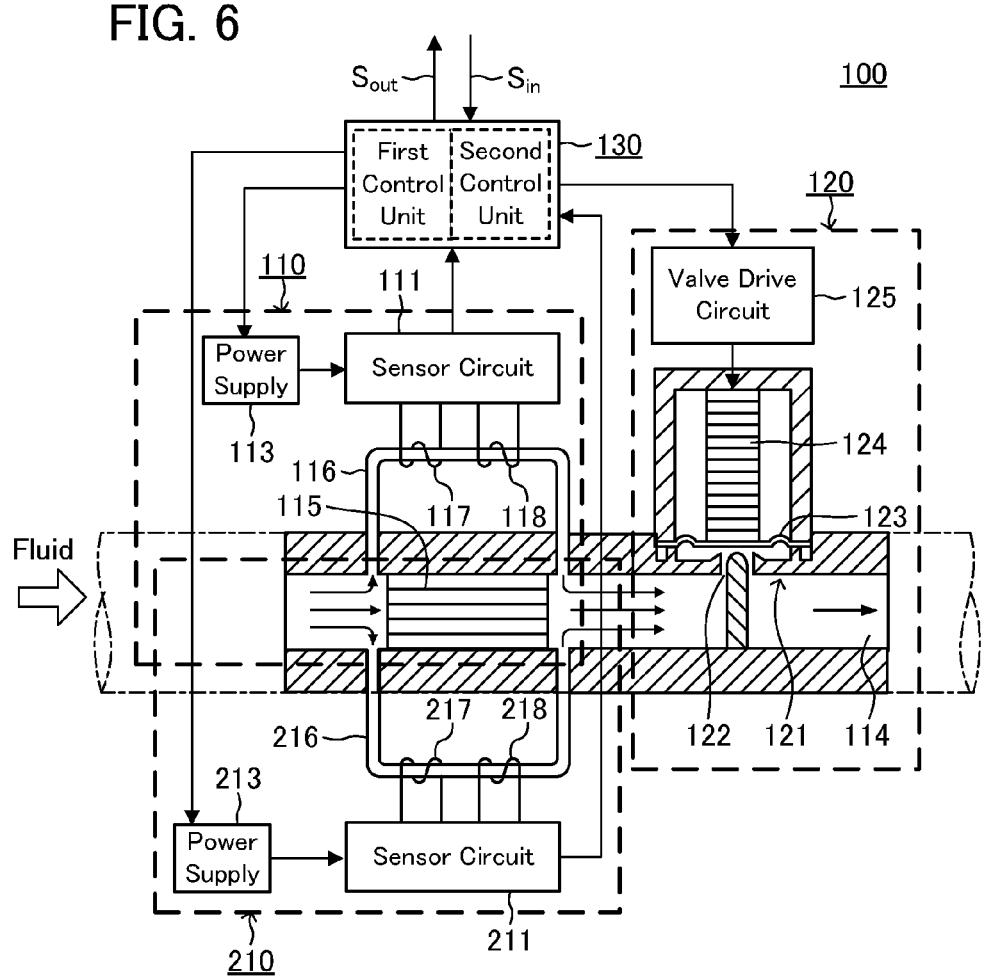
FIG. 6 is a schematic view showing an example of a configuration of a mass flow controller comprising a mass flow meter according to another embodiment of the present invention.

Therefore, the detail of the configuration of the mass flow controller according to the embodiment shown in FIG. 6 is not explained here. However, also in the mass flow meter which has the above-mentioned configuration, when the first control unit executes the above-mentioned learning function and self-diagnostics function, unless an abnormal situation as mentioned above have occurred in any of the first flow sensor unit and the second flow sensor unit, the corrected flow rate deviation should not exceed a usual measurement error. Therefore, also in accordance with the mass flow meter according to the present embodiment, the existence or non-existence of an occurrence of an abnormal situation in a flow sensor unit can be judged with a high sensitivity by setting the predetermined threshold value t as a slightly larger value than the usual measurement error.

By the way, as mentioned at the beginning of this specification, the present invention relates not only to a mass flow meter which has a self-diagnostics function, but also to a mass flow controller which uses the mass flow meter. The mass flow controller controls a flow regulation unit based on the flow rate of a fluid calculated by a mass flow meter according to the present invention, and brings the flow rate of the fluid close to a target value.

Namely, a ninth embodiment includes a mass flow controller, comprising a mass flow meter according to any one of the first to eighth embodiments of the present invention, a flow regulation unit which controls the flow rate of a fluid flowing through the flow passage, and a second control unit which controls the flow regulation unit, wherein: the second control unit controls the flow regulation unit based on the intensity of signal C which is one of the first signal and the second signal to bring the flow rate of the fluid close to a target value.

As mentioned above, the mass flow controller according to the present embodiment is a mass flow controller which comprises a mass flow meter according to any one of the first to eighth embodiments of the present invention. Therefore, the basic configuration of a mass flow meter is not explained here again since it has been already explained in the explanation about the mass flow meter according to the first to eighth embodiments of the present invention, for example, referring to FIGS. 1 and 2.

As mentioned above, the mass flow controller according to the present embodiment comprises a flow regulation unit which controls the flow rate of the fluid which flows through the above-mentioned flow passage and the second control unit which controls the above-mentioned flow regulation unit, besides the mass flow meter. The flow regulation unit is not particularly limited as long as it can control the flow rate of the fluid which flows through the flow passage. As a concrete example of the flow regulation unit, a flow control valve which can change its aperture by an actuator, for example. The second control unit is not particularly limited, either, as long as it is possible to control the flow regulation unit to increase and decrease the flow rate of the fluid which flows through the flow passage. In the example shown in FIG. 1, the mass flow controller 100 comprises the flow regulation unit 120 which controls the flow rate of the fluid which flows through the flow passage 114 and the second control unit (included in the control means 130 in FIG. 1) which controls the flow regulation unit 120, besides the first flow sensor unit 110 and the second flow sensor unit 210.

As shown in FIG. 1, the flow regulation unit 120 comprises the flow control valve 121, the valve orifice 122, the diaphragm 123, the actuator 124, the valve drive circuit 125, the power supply (not shown), etc. The second control unit included in the control means 130 controls the flow regulation unit 120 based on a signal C which is one of the first signal outputted from the first flow sensor unit 110 and the second signal outputted from the second flow sensor unit 210 to bring the flow rate of a fluid close to a target value. More specifically, the second control unit included in the control means 130 compares the flow rate of the fluid measured by either one of the first flow sensor unit 110 and the second flow sensor unit 210 with a target value, and transmits a control signal corresponding to the result to the valve drive circuit 125. Namely, the mass flow controller according to the present embodiment may control the flow rate of the fluid which flows through the flow passage 114 based on any of the first flow sensor unit 110 and the second flow sensor unit 210.

For example, when the flow rate of a fluid is smaller than the target value, the second control unit transmits a control signal to the valve drive circuit 125 so that the actuator 124 increases the aperture of the flow control valve 121 to increase the flow rate of a fluid. On the contrary, when the flow rate of a fluid is larger than the target value, the second control unit transmits a control signal to the valve drive circuit 125 so that the actuator 124 decreases the aperture of the flow control valve 121 to decrease the flow rate of a fluid. In addition, although the flow control of the fluid by a feedback mode was explained in the abovementioned explanation, the flow control of the fluid by the mass flow controller according to the present embodiment is not limited to a feedback mode, but also may be executed by other regulation modes, such as a feedforward mode, etc.

In addition, in the mass flow controller 100 according to the embodiment shown in FIG. 1, both of the first control unit and second control unit were included in the control means 130. However, all of these control units and/or other control units may be thus implemented as one control means, and may be implemented as individual control means (control units) respectively. Alternatively, among these control units and/or other control units, some may be implemented as one control means and the remaining control units may be implemented as another control means put together into one, or the remaining control units may be implemented as an individual control means (control units), respectively.

The mass flow meter, which the mass flow controller according to the present embodiment comprises, comprises two flow sensor units which have completely identical specifications, and previously measures flow rate deviations between these two flow sensor units at various mass flow rates under a circumstance having the same fluctuating factors as those in a situation where a mass flow rate is actually measured, as mentioned above. Subsequently, a correction value for matching the measurement results of the mass flow rates measured by these two flow sensor units (specifically, for making the deviation between these mass flow rates less than a predetermined threshold t) is calculated based on these flow rate deviations and stored in a data storage device. Thereafter, when measuring a mass flow rate, a corrected flow rate deviation from which an influence by an individual difference in the response to a fluctuating factor between these two flow sensor units has been eliminated is calculated by correcting measured values based on the correction value. A reliable self-diagnostics function can be achieved by judging the existence or non-existence of an occurrence of a malfunction based on whether this corrected flow rate deviation exceeds the predetermined threshold value t or not.

By the way, in the mass flow controller according to the present embodiment, when a malfunction has occurred in any of the flow regulation unit and the second control unit, it will become difficult to bring the mass flow rate of a fluid close to a target value even if a malfunction has occurred in neither the first flow sensor unit nor the second flow sensor unit. Therefore, it is desirable that the mass flow controller according to the present embodiment has a self-diagnostics function to judge an occurrence of a malfunction in any of the flow regulation unit and the second control unit.

When a malfunction has occurred in any of the flow regulation unit and the second control unit, for example, it is assumed that a control input when the second control unit controls the flow regulation unit based on the intensity of the second signal (for instance, the intensity of the control signal which the second control unit transmits to the flow regulation unit, etc.) is different from that at normal time. The mass flow controller according to the present embodiment can store a control input in relation to the mass flow rate at that time in the data storage device, at the time of the execution of the above-mentioned learning function, and can calculate a deviation between the control input and a control input at the time of the execution of the self-diagnostics function, and can judge whether a malfunction has occurred or not, based on the magnitude of the deviation.

Therefore, a tenth embodiment includes a mass flow controller according to the ninth embodiment of the present invention, wherein in the execution of the learning function, the first control unit stores a control input when the flow regulation unit is controlled based on the intensity of the signal C, in addition to the flow rate deviation and the correction value, in a data storage device, in relation to the mass flow rate at the time of measuring the intensity of the first signal and the intensity of the second signal, and in the execution of the self-diagnostics function, the first control unit determines the value of the control input of the flow regulation unit corresponding to the mass flow rate of the fluid obtained from the signal M, based on a relation between the mass flow rates and the control inputs stored in the data storage device, the first control unit calculates a control input deviation, which is a deviation between the determined value of the control input and the value of a control input when the flow regulation unit is controlled based on the intensity of the signal C in the execution of the self-diagnostics function, and the first control unit judges that there is a malfunction in either one of the first flow sensor unit, the second flow sensor unit, the flow regulation unit and the second control unit, when the control input deviation is larger than a predetermined threshold value c.

In the above, as a "control input," for example, the intensity of the control signal transmitted from the second control unit (control means 130) to the valve drive circuit 125 in order to control the actuation of the flow regulation unit 120 for the purpose of an adjustment of the flow rate of the fluid which flows through the flow passage 114, and the magnitude of the drive voltage impressed to the actuator 114 from the valve drive circuit 125 for the purpose of an adjustment of the aperture of the flow control valve 121, in FIG. 1, etc. can be adopted.

Moreover, for example, by a preliminary experiment, etc., the magnitudes of fluctuations of the intensity of the above-mentioned control signal and the magnitude of a drive voltage when the mass flow controller according to the present embodiment is normal can be obtained. Then, based on the magnitudes of fluctuations, the above-mentioned "predetermined threshold value c" can be set (for instance, as a slightly larger value than this fluctuation). When the deviation between control inputs calculated in the execution of the above-mentioned self-diagnostics function is larger than the threshold value c thus set, it is judged that there is a malfunction in at least one of the first flow sensor unit, the second flow sensor unit, the flow regulation unit, and the second control unit. Thus, the threshold value c is a threshold value used only in the execution of the self-diagnostics function by the mass flow controller.

In the above, when the corrected flow rate deviation calculated in the execution of the above-mentioned self-diagnostics function is equal to the predetermined threshold value t or less, it is judged that there is no abnormality in the first flow sensor unit and the second flow sensor unit, as mentioned above. Therefore, in this case, it can be judged that there is a malfunction in any of the flow regulation unit and the second control unit.

As mentioned above, in accordance with the mass flow controller according to the present embodiment, based on the deviation between the value of the control inputs when the second control unit controls a flow regulation unit based on the intensity of the signal C and the value of the corresponding control inputs learned at the time of normal, the existence or non-existence of a malfunction in any one of the first flow sensor unit, the second flow sensor unit, the flow regulation unit and the second control unit can be judged.

Hereinafter, sometimes referring to accompanying drawings, the configuration of the mass flow meter according to some embodiments of the present invention, etc. will be further explained in detail. However, the explanation mentioned below is absolutely aimed at exemplification, and the scope of the present invention should not be interpreted to be limited to the following explanations.

EXAMPLE

In this working example, referring to accompanying drawings, the learning function and self-diagnostics function which the mass flow meter according to one embodiment of the present invention executes will be explained in detail below. However, the configuration of the mass flow meter explained below is only one exemplification. As mentioned above, the concept of the present invention can be applied to various types of mass flow meters, such as a thermal type mass flow meter, a differential pressure type mass flow meter, a hot-wire mass flow meter and a Coriolis mass flow meter, for example.

(1) Configuration of Mass Flow Meter

The mass flow meter according to this working example was prepared as a thermal type mass flow meter which the thermal type mass flow controller having the configuration shown in FIG. 1 comprises. Since the configuration of this thermal type mass flow controller has been already explained, no explanation will be repeated here. In addition, alloy of nickel and iron was used as material for sensor wires, stainless steel SUS316 of Japanese Industrial Standard was used as material for a sensor tube, and polyimide was used as material for a covering layer. In any of the first flow sensor unit and the second flow sensor unit, the configuration of the sensor circuit is identical to the configuration of the sensor circuit shown in FIG. 2.

(2) Experimental Conditions

In the thermal type mass flow meter according to this working example which has the configuration as mentioned above, the learning function and the self-diagnostics function were executed using five sorts of gases (nitrogen gas ($N_2$), sulfur hexafluoride ($SF_6$), helium (He), argon (Ar) and perfluoro cyclobutane ($C_4F_8$)) as fluids. The pressure of fluid in a flow passage was adjusted to 0.05 MPa only for perfluoro cyclobutane ($C_4F_8$), and adjusted to 0.2 MPa for all other gases. Moreover, as for temperature, experiments were performed at three temperatures of 10° C., 25° C. and 55° C. for each of the gases, and the maximal flow rate (full scale) was set to 5 slm for all gases, and the learning function was executed while controlling the flow regulation unit (flow control valve) to flow the fluids at flow rate settings at 10% interval in the range from 100% to 10% of the maximal flow rate. The concrete execution procedure of the learning function will be explained in detail below, referring to the flowchart in FIG. 3.

(3) Execution Procedure of Learning Function

As mentioned above, the learning function may be implemented as a program stored in a data storage device which an electrical control unit constituting the first control unit (such as a microcomputer) comprises, or as an application software installed in a computer used in cooperation with the mass flow meter according to this working example, so as to be automatically executed when the mass flow meter is used for the first time after manufacturing, for example. Alternatively, the learning function may be configured so as to be started by an operation by a user to an operating part, such as a button, which the mass flow meter according to this working example comprises, or to a user interface provided by an application software installed in a computer used in cooperation with the mass flow meter, for example.

The thermal type mass flow meter according to this working example was configured so that the execution of the learning function was started by an instruction (command) sent out via a serial communication (RS485) to the thermal type mass flow meter from an application software installed in a host computer used in cooperation with the thermal type mass flow meter, and the learning function was executed in accordance with a program stored in a data storage device of a microcomputer constituting the first control unit that the thermal type mass flow meter comprised.

Figure 3:
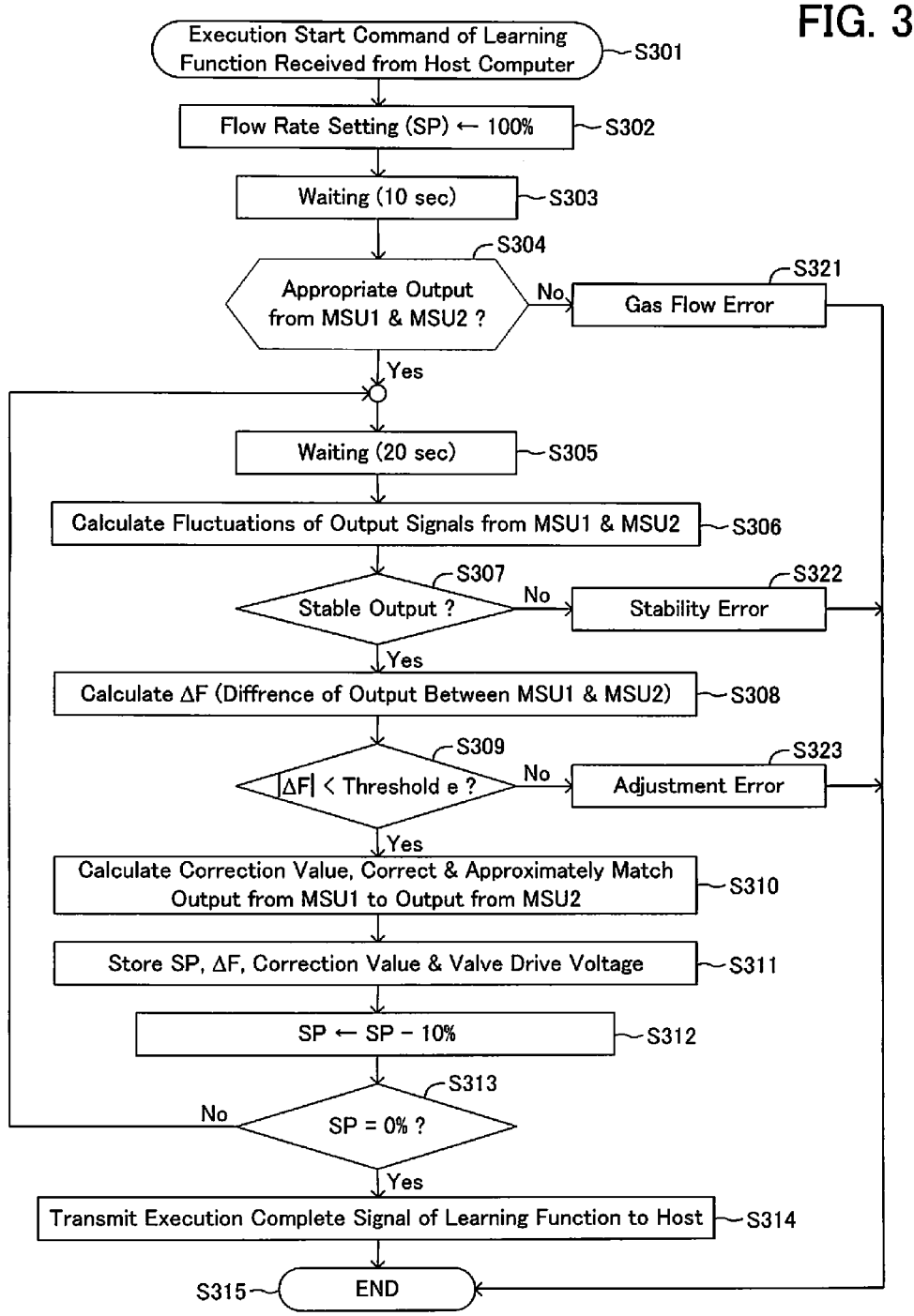
FIG. 3 is a flowchart showing an execution procedure of a learning function in a mass flow meter according to a working example.

As mentioned above, FIG. 3 is a flowchart showing an execution procedure of a learning function in a mass flow meter according to a working example. As shown in FIG. 3, first, in step S301, an execution start command of the learning function is received from the host computer. Thereby, the first control unit, which the thermal type mass flow meter according to this working example comprises, starts the execution of a learning function in accordance with a program stored in the data storage device which a microcomputer comprises.

Next, in step S302, the second control unit controls the flow regulation unit to set a flow rate setting (SP) at 100% (namely, 5 slm which is the maximal flow rate (full scale)). Next, in step S303, it waits for a predetermined period (in this working example, for 10 seconds) to stabilize the flow rate of a fluid. Next, in step S304, it is judged whether the mass flow rates corresponding to the output signals from the first flow sensor unit (MSU1) and the second flow sensor unit (MSU2) fall within an appropriate range (for instance, 100%±10% of the maximal flow rate (full scale)) or not.

When it was judged that the mass flow rates corresponding to the output signals from MSU1 and MSU2 fell within the appropriate range in the abovementioned step S304 (step S304: Yes), it waits for a predetermined period (in this working example, for 20 seconds) to stabilize the flow rate of a fluid. Next, in step S306, the extents of fluctuations of the output signals from MSU1 and MSU2 are calculated. Next, in step S307, it is judged whether the output signals from MSU1 and MSU2 are stable or not. In this working example, it is judged to be stable when the maximum ranges of fluctuations for 3 seconds of the output signals from MSU1 and MSU2 are 0.2% or less.

When it was judged that the output signals from MSU1 and MSU2 were stable in the above-mentioned step S307 (step S307: Yes), in the following step S308, the difference $\Delta F$ between the intensities of the output signals from MSU1 and MSU2 (corresponding to the above-mentioned flow rate deviation) is calculated. Specifically, $\Delta F$ was calculated by subtracting the intensity of the output signal from MSU2 from the intensity of the output signal from MSU1. Next, in step S309, it is judged whether the absolute value ($|\Delta F|$) of the above-mentioned $\Delta F$ is less than the predetermined threshold value e or not. Unlike the threshold value d for a learning function and the threshold values t and c for a self-diagnostics function, this threshold value e is a threshold value for judging whether a situation where the $|\Delta F|$ becomes remarkably large due to an apparent abnormity of MSU1 and MSU2, etc. has occurred or not.

When it was judged that $|\Delta F|$ was less than the threshold value e in the above-mentioned step S309, since it is judged that an apparent abnormity of MSU1 and MSU2, etc. has not occurred. Therefore, in the following step S310, a correction value for approximately matching the intensity of the output signal from MSU1 with the intensity of the output signal from MSU2 is calculated, and the intensity of the output signal from MSU1 is corrected using the calculated correction value. Specifically, a correction value, with which the output signal from MSU1 can be corrected so that the absolute value ($|\Delta F|$) of the difference $\Delta F$ between the intensities of the output signals from MSU1 and MSU2 becomes less than the predetermined threshold d, is calculated.

As mentioned above, the above-mentioned correction value may be a value obtained by subtracting the intensity of the output signal from MSU1 from the intensity of the output signal from MSU2, or may be a value obtained by dividing the intensity of the output signal from MSU2 by the intensity of the output signal from MSU1. In the former case, $\Delta F$ can be brought close to 0 (zero) by adding the correction value to the intensity of the output signal from MSU1. In the latter case, $\Delta F$ can be brought close to 0 (zero) by multiplying the intensity of the output signal from MSU1 by the correction value. In addition, in this working example, the correction value of the latter type was adopted, and the intensity of the output signal from MSU1 was corrected using the representative value which is a mean value of all the correction values stored in the data storage device, as will be mentioned later in detail.

Next, in step S311, in relation to the flow rate setting (SP) at this time, the flow rate deviation $\Delta F$ before correction, the correction value, and the valve drive voltage impressed to an actuator from a valve drive circuit, which the flow regulation unit comprises, in accordance with an instruction from the second control unit are stored in the data storage device which the first control unit comprises.

As mentioned above, learning at a certain SP is completed. Then, in the following step S312, the SP is changed for the next learning. In this working example, the SP is decreased in decrements of 10%. In the following step S313, it is judged whether the SP at the time is 0% or not.

When it was judged that the SP at the time is 0% in the above-mentioned step S313 (step S313: Yes), since it is judged that learning at all the scheduled SPs has been completed. Therefore, in the following step S314, a signal which shows that the execution of the learning function has been completed is transmitted to the host computer, and the routine is ended in the following step S315. On the other hand, when it was judged that the SP at the time was not 0% in the above-mentioned step S313 (step S313: No), since it is judged that learning at all the scheduled SPs has not yet been completed. Therefore, the procedure returns to the above-mentioned step S305 and each step from step S305 to step S313 is executed repeatedly. Thereby, learning at all the scheduled SPs can be completed.

In addition, when it was judged that the mass flow rate corresponding to the output signals from MSU1 and MSU2 did not fall within an appropriate range in the above-mentioned step S304 (step S304: No), when it was judged that the output signals from MSU1 and MSU2 were not stable in the above-mentioned step S307 (step S307: No), and when it was judged that |ΔF| was equal to the threshold e or more in the above-mentioned step S309 (step S309: No), since it is judged that any abnormity (error) has occurred in the thermal type mass flow meter, the procedure progresses to step S315 and once terminate the routine. At this time, a step in which a signal showing that the routine was terminated due to any abnormity (error) in the thermal type mass flow meter is transmitted to the host computer may be added.

As mentioned above, in the thermal type mass flow meter according to this working example, by the execution of the learning function, the correction value for eliminating the influence of the individual difference in the response to a fluctuating factor in the intensities of the output signals from the first flow sensor unit (MSU1) and the second flow sensor unit (MSU2) can be acquired. Thereby, when executing the self-diagnostics function thereafter, the influence by the individual difference in the response to a fluctuating factor can be eliminated from the flow rate deviation (ΔF) between MSU1 and MSU2 by correcting the intensity of the output signal from MSU1 by the above-mentioned correction value. As a result, since the threshold value t for judging an occurrence of a malfunction in MSU1 and MSU2 based on ΔF can be set as a small value, the existence or non-existence of an occurrence of a malfunction in MSU1 and MSU2 can be judged with a high sensitivity.

(3) Execution Result of Learning Function

Figure 4:
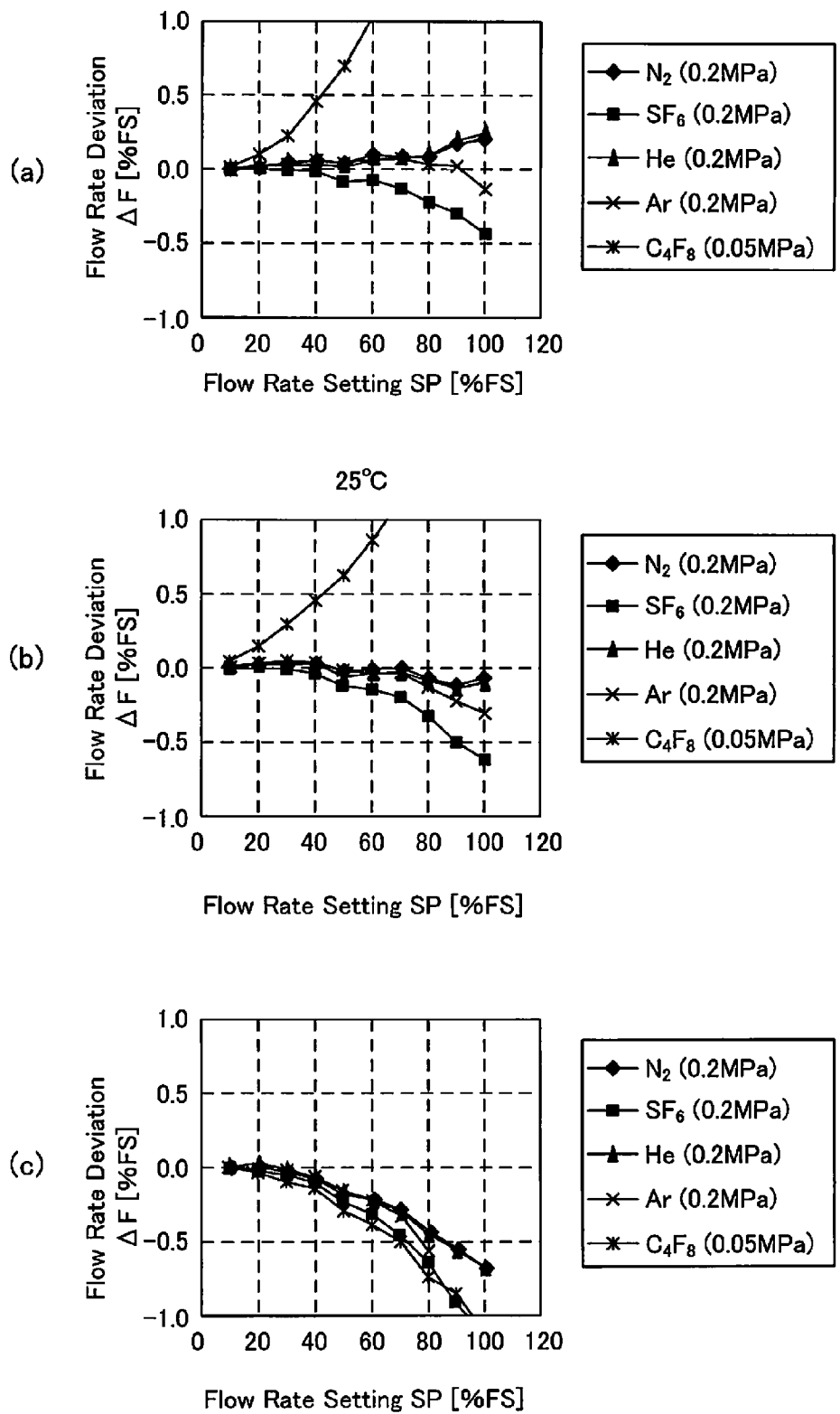
FIG. 4 is a graph showing flow rate deviations ($\Delta Fs$), which have not yet been corrected, measured for various gases at various flow rate settings (SPs), in the execution of a learning function.

The flow rate deviations (ΔFs) at various flow rate settings (SPs) of five sorts of gases (nitrogen gas ($N_2$), sulfur hexafluoride ($SF_6$), helium (He), argon (Ar), and perfluoro cyclobutane ($C_4F_8$)) acquired by the execution of the above-mentioned learning function are shown in FIG. 4. As mentioned above, FIG. 4 is a graph showing the result of measurement of the uncorrected flow rate deviations (ΔFs) at various flow rate settings (SPs) for various gases. In addition, in FIG. 4, (a), (b) and (c) show the measurement results at 10° C., 25° C. and 55° C., respectively. Moreover, the longitudinal axis of each graph is described as a percentage (% FS) to a full scale of flow rate deviation ΔF.

As shown in FIG. 4, the deviation between the intensities of the output signals from the first flow sensor unit (MSU1) and the second flow sensor unit (MSU2) (corresponding to the flow rate deviation ΔF) shows a large value exceeding a usual measurement error (in this working example, 1.0%) for some sorts of gasses and at some temperature, which were used. This means that the responses to a fluctuating factor (for instance, sort of fluid, temperature and pressure, etc.) differ between MSU1 and MSU2 (there is an individual difference). Therefore, in order to detect an occurrence of a malfunction in MSU1 or MSU2 with a high sensitivity, it is desirable to eliminate the influence of the individual difference in the response to such a fluctuating factor.

Then, in the thermal type mass flow meter according to this working example, as mentioned above, the correction value for eliminating the influence of the individual difference in the response to a fluctuating factor in the intensity of the output signal from MSU1 and MSU2 is acquired by the execution of a learning function. Furthermore, when executing a self-diagnostics function thereafter, the influence by the individual difference in the response to a fluctuating factor is eliminated from the flow rate deviation (ΔF) between MSU1 and MSU2 by correcting the intensity of the output signal from MSU1 using the above-mentioned correction value.

(4) Effect of Correction by Learned Correction Value

Here, the result of elimination of the influence by the individual difference in the response to a fluctuating factor from the flow rate deviation (ΔF) between MSU1 and MSU2 by correcting the intensity of the output signal from MSU1 by the above-mentioned correction value as mentioned above will be explained, referring to a graph shown in FIG. 5. As mentioned above, FIG. 5 is a graph showing a calculation result of corrected flow rate deviations (ΔFcs) between MSU1 and MSU2 calculated for various gases at various flow rate settings (SPs), wherein the influence by the individual difference in the response to a fluctuating factor has been eliminated by correcting the intensity of the output signal from MSU1 using the correction value obtained by the execution of the learning function. In addition, in FIG. 5, (a), (b) and (c) show the calculation result at 10° C., 25° C. and 55° C., respectively.

As mentioned above, in this working example, a value obtained by dividing the intensity of the output signal from MSU2 by the intensity of the output signal from MSU1 was adopted as a correction value, and the intensity of the output signal from MSU1 was corrected by a representative value which is a mean value of all the correction values stored in the data storage device. Specifically, the intensity of the output signal from MSU1 was corrected by multiplying the intensity of the output signal from MSU1 at each flow rate setting (SP) by the abovementioned representative value as a proportionality coefficient, and the deviation between the intensity of the output signal from MSU1, which was thus corrected, and the intensity of the output signal from MSU2 was calculated as a corrected flow rate deviation.

Figure 5:
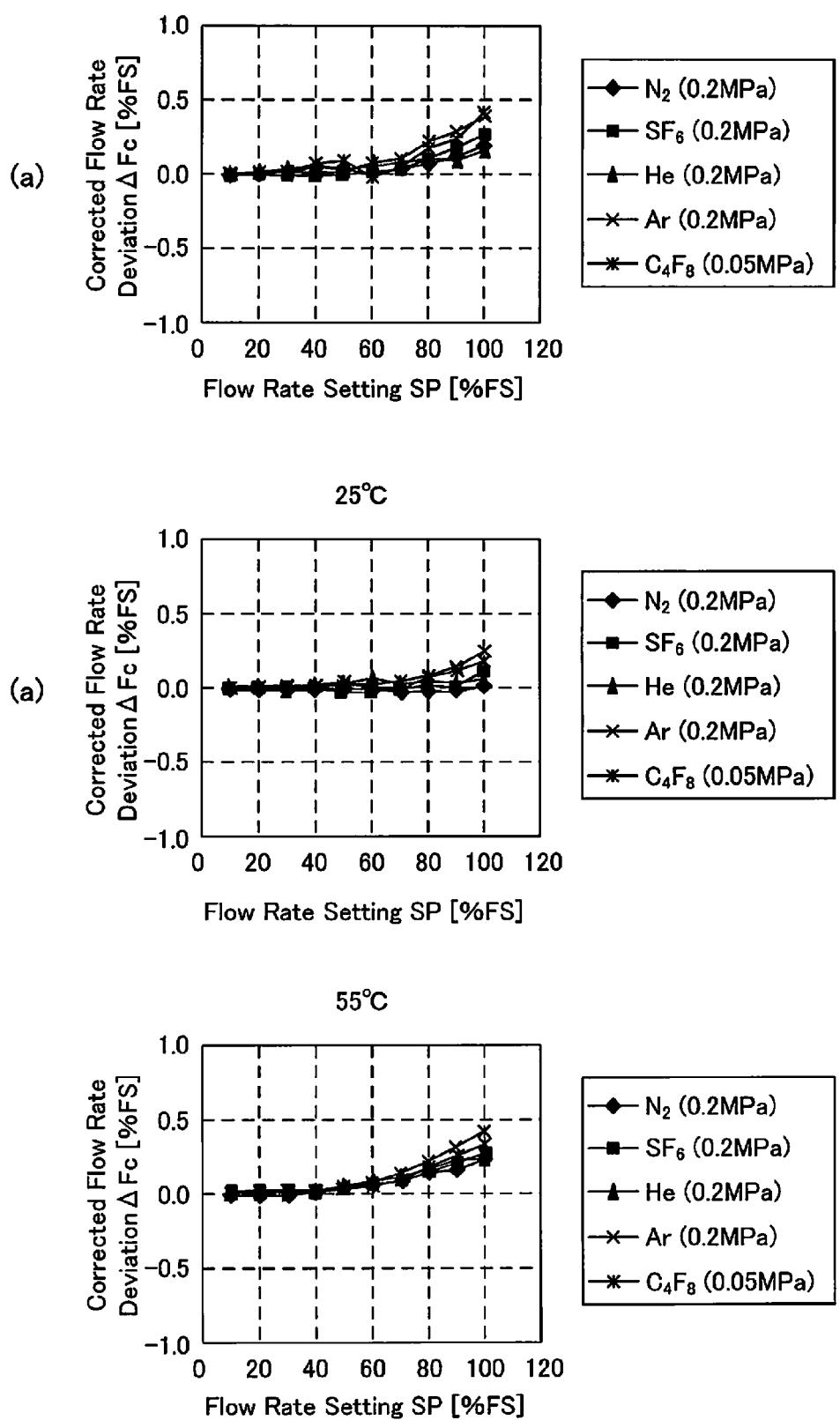
FIG. 5 is a graph showing a calculation result of corrected flow rate deviations ($\Delta Fcs$) between a first flow sensor unit (MSU1) and a second flow sensor unit (MSU2) calculated for various gases at various flow rate settings (SPs), wherein an influence by an individual difference in a response to a fluctuating factor has been eliminated by correcting the intensity of an output signal from the first flow sensor unit (MSU1) using the correction value obtained by the execution of a learning function.

As the result of the above, as shown in FIG. 5, for any sorts of gasses and at any temperatures, over all the flow rate settings (SPs), the corrected flow rate deviation (ΔFc) was smaller than the flow rate deviation (ΔF). This means that the influence by the individual difference in the response to a fluctuating factor was eliminated by correcting the intensity of the output signal from MSU1 using the correction value obtained by the execution of the learning function. Thereby, since the threshold value t for judging an occurrence of a malfunction in MSU1 and MSU2 based on the corrected flow rate deviation (ΔFc) can be set as a smaller value in accordance with the thermal type mass flow meter according to this working example, the existence or non-existence of an occurrence of a malfunction in MSU1 and MSU2 can be judged with a high sensitivity.

In addition, in this working example, the intensity of the output signal from MSU1 was corrected by the representative value which is a mean value of all the correction values stored in the data storage device, as mentioned above. However, when the intensity of the output signal from MSU1 is corrected, not by such a representative value, but using the correction value obtained at each flow rate setting (SP), the influence by the individual difference in the response to a fluctuating factor can be more strictly eliminated. In this case, since the corrected flow rate deviation (ΔFc) further approaches 0 (zero), the threshold value t for judging an occurrence of a malfunction in MSU1 and MSU2 based on the corrected flow rate deviation (ΔFc) can be set as a further smaller value. As a result, the existence or non-existence of an occurrence of a malfunction in MSU1 and MSU2 can be judged with a further higher sensitivity.

Although some the embodiments and working examples which have specific configurations have been described for the purpose of explaining the present invention, it is needless to say that the scope of the present invention is not limited to these exemplary embodiments and working examples and can be suitably modified within the limits of the matter described in the claims and the specification.

What is claimed is:

1. A mass flow meter, comprising:
a flow passage through which a fluid flows,
a first flow sensor unit which outputs a first signal that is an output signal corresponding to a mass flow rate of said fluid which flows through said flow passage,
a second flow sensor unit which outputs a second signal that is an output signal corresponding to a mass flow rate of said fluid which flows through said flow passage, and
a first control unit which determines whether there is a malfunction in said first flow sensor unit or said second flow sensor unit based on the extent of a deviation between the intensity of said first signal and the intensity of said second signal, and
said first flow sensor unit and said second flow sensor unit have an identical specifications; wherein
said first control unit is configured so as to:
flow said fluid through said flow passage at a plurality of different mass flow rates in a predetermined range and at a predetermined temperature and pressure,
execute a learning function for each of said plurality of different mass flow rates, in which:
said first control unit measures the intensity of said first signal and the intensity of said second signal,
said first control unit calculates a flow rate deviation, which is a deviation between the intensity of said first signal and the intensity of said second signal, and a correction value for correcting the intensity of a signal S, which is one of said first signal and said second signal, to make the absolute value of said flow rate deviation less than a predetermined threshold value d, and
said first control unit stores said flow rate deviation and said correction value in a data storage device in relation to a mass flow rate at the time of measuring the intensity of said first signal and the intensity of said second signal, and
execute a self-diagnostics function when measuring a mass flow rate of said fluid in said predetermined temperature and pressure after the execution of said learning function, in which:
said first control unit measures the intensity of said first signal and the intensity of said second signal,
said first control unit corrects the intensity of said signal S based on said correction value stored in said data storage device,
said first control unit calculates a corrected flow rate deviation which is a deviation between the intensity of said corrected signal S and the intensity of a signal M which is one of said first signal and said second signal and a signal other than said signal S, and
said first control unit judges that there is a malfunction in either one of said first flow sensor unit and said second flow sensor unit when said corrected flow rate deviation is larger than a predetermined threshold value t.

2. The mass flow meter of claim 1, wherein:
in the execution of said self-diagnostics function,
said first control unit determines a value of a correction value corresponding to a mass flow rate of said fluid obtained from said signal M, based on a relation between said mass flow rates and said correction values stored in said data storage device, and
said first control unit corrects the intensity of said signal S, based on the value of said determined correction value.

3. The mass flow meter of claim 1, wherein:
in the execution of said self-diagnostics function,
said first control unit corrects the intensity of said signal S, based on a representative value of all said correction values stored in said data storage device.

4. The mass flow meter of claim 1, wherein:
said first control unit calculates as said correction value a value obtained by subtracting the intensity of said signal S from the intensity of said signal M, in the execution of said learning function, and
said first control unit corrects the intensity of said signal S by adding said correction value to the intensity of said signal S, in the execution of said self-diagnostics function.

5. The mass flow meter of claim 1, wherein:
said first control unit calculates as said correction value a value obtained by dividing the intensity of said signal M by the intensity of said signal S, in the execution of said learning function, and
said first control unit corrects the intensity of said signal S by multiplying the intensity of said signal S by said correction value, in the execution of said self-diagnostics function.

6. The mass flow meter of claim 1, wherein:
said first flow sensor unit and said second flow sensor unit are thermal type flow sensor units, comprising:
a bypass disposed in the middle of said flow passage,
a sensor tube which branches from said flow passage at the upstream side of said bypass and joins said flow passage at the downstream side of said bypass,
a pair of sensor wires disposed so as to be able to conduct heat to a fluid flowing through said sensor tube,
a power supply for supplying an input signal for making said sensor wires generate heat, and
a sensor circuit which comprises a bridge circuit containing said sensor wires.

7. The mass flow meter of claim 6, wherein:
said first flow sensor unit and said second flow sensor unit comprise an individual bypass, respectively.

8. The mass flow meter of claim 6, wherein:
said first flow sensor unit and said second flow sensor unit comprise a common bypass.

9. The mass flow meter of claim 1, comprising:
a flow regulation unit which controls the flow rate of a fluid flowing through said flow passage, and
a second control unit which controls said flow regulation unit, wherein:
said second control unit controls said flow regulation unit based on the intensity of signal C which is one of said first signal and said second signal to bring the flow rate of said fluid close to a target value.

10. The mass flow meter of claim 9, wherein:
in the execution of said learning function, said first control unit stores a control input when said flow regulation unit is controlled based on the intensity of said signal C, in addition to said flow rate deviation and said correction value, in a data storage device, in relation to the mass flow rate at the time of measuring the intensity of said first signal and the intensity of said second signal, and
in the execution of said self-diagnostics function,
said first control unit determines the value of the control input of said flow regulation unit corresponding to the mass flow rate of said fluid obtained from said signal M, based on a relation between said mass flow rates and said control inputs stored in said data storage device,
said first control unit calculates a control input deviation, which is a deviation between said determined value of said control input and the value of a control input when said flow regulation unit is controlled based on the intensity of said signal C in the execution of said self-diagnostics function, and said first control unit judges that there is a malfunction in either one of said first flow sensor unit, said second flow sensor unit, said flow regulation unit and said second control unit, when said control input deviation is larger than a predetermined threshold value c.

11. A mass flow meter, comprising:

a flow passage through which a fluid flows, a first flow sensor unit which outputs a first flow sensor signal corresponding to a mass flow rate of the fluid through the flow passage, a second flow sensor unit which outputs a second flow sensor signal corresponding to a mass flow rate of the fluid through the flow passage, and a first control unit which determines whether there is a malfunction in the first flow sensor unit or the second flow sensor unit based on the extent of a deviation between the first sensor signal and the second flow sensor signal, and the first control unit includes a processor and non-transitory processor executable instructions, the non-transitory processor executable instructions, when executed by the processor, effectuate:

flow of the fluid through the flow passage at a plurality of different mass flow rates in a predetermined range and at a predetermined temperature and pressure, execution of a learning function for each of the plurality of different mass flow rates, wherein execution of the learning function includes:

calculating a flow rate deviation based upon a deviation between the first flow sensor signal and the second flow sensor signal, and calculating a correction value for correcting the intensity of a signal S, which is one of the first flow rate signal and the second flow rate signal, to make an absolute value of the flow rate deviation less than a predetermined threshold value d, and the first control unit stores the flow rate deviation and the correction value in a data storage device in relation to a mass flow rate at the time of measuring the first flow rate signal and the second flow rate signal, and execution of a self-diagnostics function when measuring a mass flow rate of the fluid in the predetermined temperature and pressure after the execution of the learning function, wherein execution of the self-diagnostics function includes:

measuring the first flow rate signal and the second flow rate signal, correcting one of the first flow sensor signal and the second flow sensor signal based on the correction value stored in the data storage device;

calculating a corrected flow rate deviation between the corrected signal S and a signal M which is one of the first flow rate signal and the second flow rate signal and a signal other than the signal S, and determining that there is a malfunction in either one of the first flow sensor unit and the second flow sensor unit when the corrected flow rate deviation is larger than a predetermined threshold value t.

* * * * *